United States Patent
Sitzmann

(10) Patent No.: US 7,022,197 B2
(45) Date of Patent: Apr. 4, 2006

(54) PROCESS FOR BONDING SEVERAL LAYERS OF PLASTIC FILM

(75) Inventor: Stefan Sitzmann, Forchheim (DE)

(73) Assignee: Huhtamaki Forcheim Zweigniederlassung der Huhtamaki Deutschland GmbH & Co. KG, Forcheim (DE)

( * ) Notice: Subject to any disclaimer, the term of this patent is extended or adjusted under 35 U.S.C. 154(b) by 0 days.

(21) Appl. No.: 10/389,645

(22) Filed: Mar. 14, 2003

(65) Prior Publication Data

US 2003/0173016 A1 Sep. 18, 2003

(30) Foreign Application Priority Data

Mar. 15, 2002 (DE) .......................... 102 11 680

(51) Int. Cl.
*B29C 65/08* (2006.01)

(52) U.S. Cl. .................... 156/73.1; 156/290; 156/308.4

(58) Field of Classification Search ................ 156/73.1, 156/290, 308.2, 308.4, 250, 252, 253, 580.1, 156/580.2; 264/442, 443, 445; 425/174.2
See application file for complete search history.

(56) References Cited

U.S. PATENT DOCUMENTS

| | | | | |
|---|---|---|---|---|
| 4,476,979 A | * | 10/1984 | Reimann et al. | 206/554 |
| 4,562,925 A | * | 1/1986 | Pistner | 206/554 |
| 4,744,200 A | * | 5/1988 | Benoit et al. | 53/447 |
| 4,785,938 A | * | 11/1988 | Benoit et al. | 206/554 |
| 5,495,946 A | * | 3/1996 | Pickering et al. | 206/554 |
| 5,526,934 A | | 6/1996 | Pickering et al. | |
| 5,682,730 A | * | 11/1997 | Dobreski | 53/469 |
| 6,536,951 B1 | * | 3/2003 | Sill | 383/9 |

FOREIGN PATENT DOCUMENTS

| | | |
|---|---|---|
| DE | 39 23 713 | 1/1991 |
| DE | 197 15 263 | 10/1998 |
| DE | 19935065 | 9/2000 |

* cited by examiner

*Primary Examiner*—James Sells
(74) *Attorney, Agent, or Firm*—Jordan and Hamburg LLP

(57) ABSTRACT

A process for bonding several layers of plastic film, particularly plastic bags, into a block, where it is supposed to be possible to remove the plastic films or plastic bags form the block individually; the plastic films or plastic bags are bonded together in an edge strip by means of ultrasonic welding.

35 Claims, 2 Drawing Sheets

PROCESS FOR BONDING SEVERAL LAYERS OF PLASTIC FILM

Figure 1:
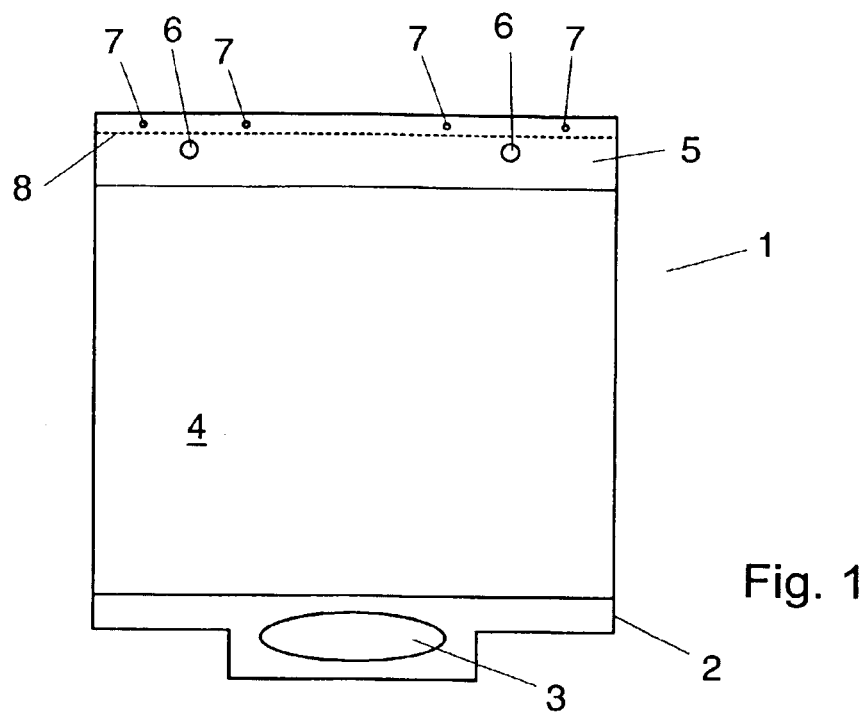

The invention relates to a process for bonding several layers of plastic film, particularly plastic bags, into a block, where it is supposed to be possible to remove the plastic films or plastic bags from the block individually.

DE-A-199 35 065 discloses the welding of a pile of plastic bags using heated needles.

Such a process does not, however, lead to consistent bonding of all the bags located next to each other.

The purpose of the invention is to propose a process with which all the plastic films or bags are bonded at least approximately consistently, so that roughly the same force always has to be exerted when individual films or bags are removed.

In the solution to this problem proposed by the invention, the plastic films or plastic bags are bonded together in an edge strip by means of ultrasonic welding.

Very effectively controllable welding is possible with ultrasonic welding, so that very consistent bonds can be produced between the individual layers too.

In an advantageous further development of the invention, at least two welds are provided.

This on the one hand reduces the bonding force each individual weld needs to exert, while the bonded films or bags are held together very well on the other.

It is, however, also possible in accordance with the invention that at least one weld extends longitudinally.

The individual layers are held together very effectively as a result of this too.

In another advantageous development of the invention, the welds are designed in such a way that they can be separated comparatively easily.

This guarantees that no disruptions occur, particularly when the films or bags are processed automatically.

Easy removal of the individual layers is also guaranteed in accordance with the invention when the welds are separated from the part of the plastic film or plastic bag that is to be removed by a perforation line.

It has proved to be particularly advantageous in this context if in accordance with another development of the invention the perforation line is located parallel to an outer edge of the plastic film or plastic bag.

This makes it particularly easy to remove the plastic films or plastic bags from the edge strip with the welds.

It is, however, also possible in accordance with the invention that every weld is surrounded by a perforation line, which begins at one outer edge of the plastic film or plastic bag and ends at the same outer edge.

The perforation line can extend around the weld in a semi-circular pattern in accordance with the invention here.

It is, however, also possible for the perforation line to have a rectangular shape.

In another advantageous further development of the invention, the ultrasonic welding operation is carried out by a pen-shaped sonotrode, which penetrates the layers of the plastic films or plastic bags that are to be welded in the course of the welding operation and forms a welding ring while doing so.

The sonotrode is lowered inside the block that is to be welded during the welding operation and makes contact with all the individual layers of the block during this process.

It has proved to be very advantageous here if in accordance with another further development of the invention a sonotrode is used for ultrasonic welding that can be pressed against the plastic layers which are to be welded through an opening in a hold-down device.

It is very advantageous in this context if in accordance with the invention the pen-shaped sonotrode has a projection with a larger diameter that rests on the top layer of the plastic layers which are to be welded at the end of the welding operation.

The top layers of the block are pressed together reliably too as a result.

In another advantageous further development of the invention, the projection has at least two points located opposite each other that are aimed at the pile of plastic films or plastic bags in order to weld the top layers together.

Figure 2:
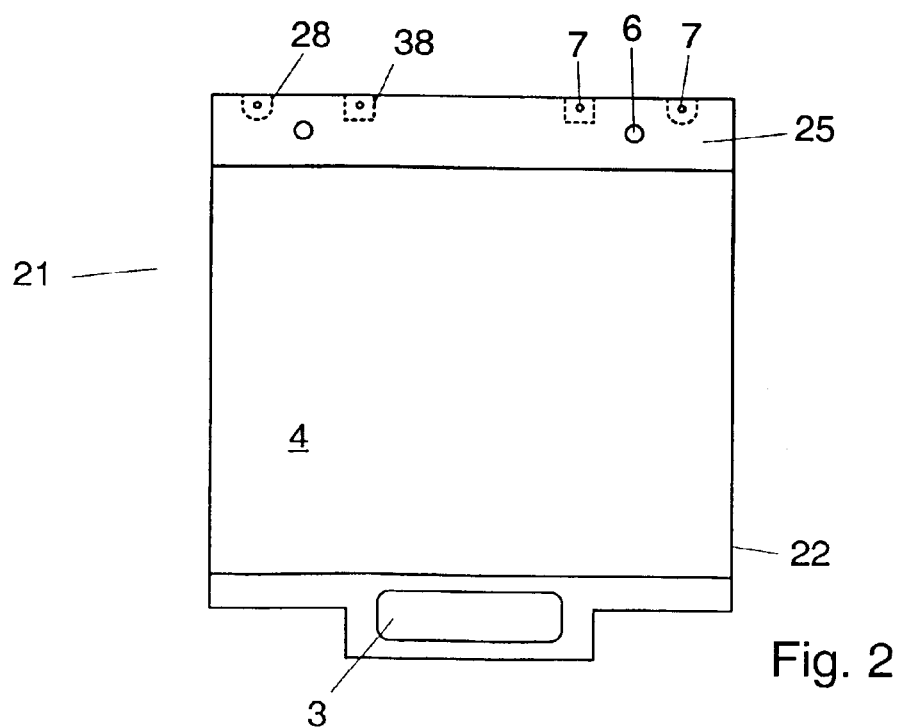
Figure 3:
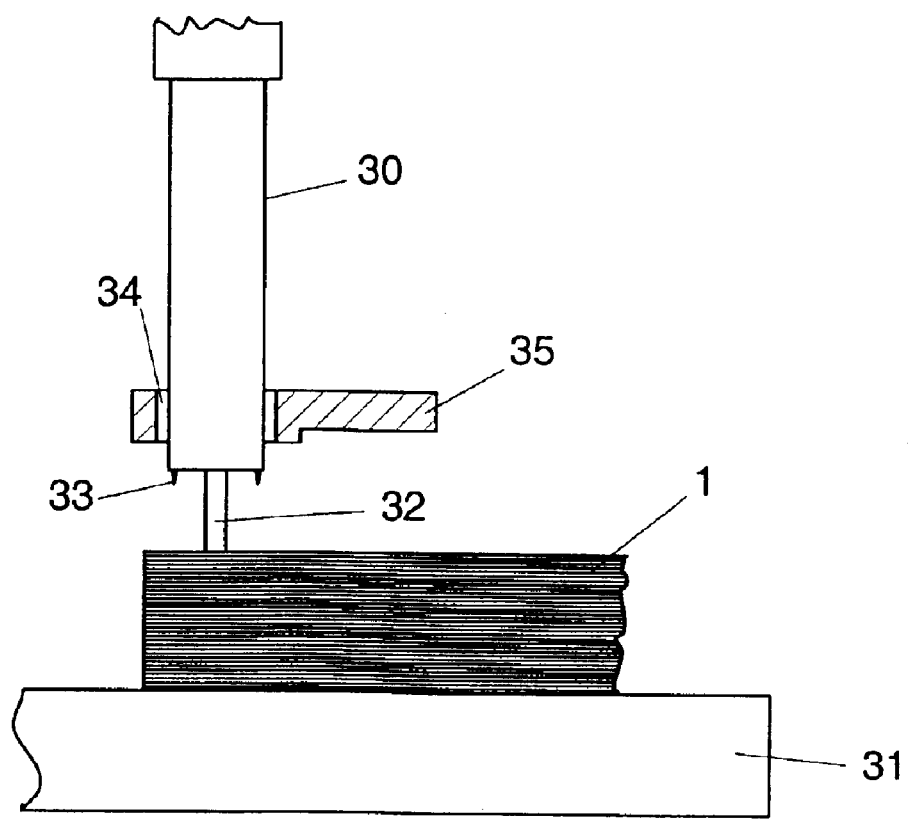

Embodiments of the invention are illustrated in the drawings:

FIG. 1 is a top view of a block of plastic bags that are bonded together at their bottom end by welds which are separated from the bags themselves by an uninterrupted perforation line, FIG. 2 is a top view of another block of plastic bags, in which the welds are separated by individual perforation lines and FIG. 3 is a sonotrode for welding plastic bags.

1 in FIG. 1 is a block of plastic bags 2, only the top plastic bag 2 of which is shown in the drawing. The bags 2 are provided with a carry handle 3 and one of the side panels 4 is shorter than the other side panel 5. Two holes 6 for securing the bag 2 while it is being filled are provided in this longer side panel 5. The individual bags are bonded together with the help of four welds 7. These four welds 7 are separated from the rest of the side panel 5 by a perforation line 8 that extends transversely across the side panel 5. One bag 2 at a time is then removed from the block 1 of bags along this perforation line 8.

A block 21 of practically identical plastic bags 22 is shown in FIG. 2. The only difference is that the welds 7 in the second side panel 25 are separated off individually by perforation lines 28 and 38.

The perforation lines 28 are provided around the welds 7 in a semi-circular pattern, with both ends of the perforation line leading to the same edge of the side panel 25.

The perforation lines 38, on the other hand, extend around the welds 7 in a rectangular pattern.

FIG. 3 shows a sonotrode 30 that interacts with an anvil 31. At its lower end facing the anvil 31, the sonotrode 30 is provided with a pen-shaped sonotrode projection 32 with a diameter of about 2.5 mm. 2 diametrically opposite points 33 are provided at the bottom end of the sonotrode. The sonotrode 30 reaches through the opening 34 of a hold-down device 35 and its height can be adjusted.

The block 1 of plastic bags 2 that is to be welded is placed on the anvil 31 and is secured by the hold-down device 35.

The pen-shaped projection 32 is placed on the block 1 and the ultrasonic system is switched on while the sonotrode is at the same time pressed downwards. The pen-shaped projection of the sonotrode welds itself into the block 1 in the course of this operation. At the end of the welding operation, the two points 33 also rest on the top bag of the block 1 and welds the top layers additionally.

When the sonotrode 30 with the pen-shaped projection 32 is pulled out of the block 1, the projection leaves a cylindrical welding channel behind it, with the result that the welding holds the individual layers together.

What is claimed is:

1. Process for bonding a plurality of plastic films or a plurality of plastic bags into a block from which each plastic film or plastic bag is removable individually, comprising arranging the plastic films or plastic bags in a stack and bonding the plastic films or plastic bags together in an edge zone of the stack by means of ultrasonic welding; and wherein the ultrasonic welding is carried out by a sonotrode by pressing the sonotrode against the plastic layers which are to be welded through an opening in a hold-down device.

2. Process according to claim 1, wherein the ultrasonic welding forms at least two welds.

3. Process according to claim 1, wherein at least one weld extends longitudinally.

4. Process according to claim 1, wherein the welds are readily separable.

5. Process according to claim 1, wherein the welds are separated from the removable plastic film or plastic bag by a perforation line.

6. Process according to claim 5, wherein the perforation line is located parallel to an outer edge of the plastic film or plastic bag.

7. Process according to claim 5, wherein every weld is surrounded by a perforation line, which begins at one outer edge of the plastic film or plastic bag and ends at the same outer edge.

8. Process according to claim 7, wherein the perforation line extends around the weld in a semi-circular pattern.

9. Process according to claim 7, wherein the perforation line has a rectangular shape.

10. Process according to one of claims 1 to 9, wherein the ultrasonic welding is carried out by a pen-shaped sonotrode which penetrates the plastic films or plastic bags that are to be welded and forms a welding ring while doing so.

11. Process according to claim 10, wherein the pen-shaped sonotrode has a projection with a larger diameter that, at the end of the welding operation, rests on the top plastic film or plastic bag of the stack.

12. Process according to claim 11, wherein the projection has at least two points located opposite each other that are aimed at the stack in order to weld the top plastic films or plastic bags together.

13. A process for bonding a plurality of plastic films or a plurality of plastic bags into a block from which each plastic film or plastic bag is removable individually, said process comprising:

arranging the plastic films or plastic bags in a stack and bonding the plastic films or plastic bags together in an edge zone of the stack by means of ultrasonic welding;

providing said block with at least one securing hole;

wherein the welds are separated from the removable plastic film or plastic bag by a perforation line;

wherein every weld is surrounded by and disposed within a curve formed by an individual perforation line, said perforation line beginning at one outer edge of the plastic film or plastic bag and ends at the same outer edge; and said securing hole being distanced from each weld and disposed exterior to each perforation line.

14. Process according to claim 13, wherein the ultrasonic welding forms at least two welds.

15. Process according to claim 13, wherein at least one weld extends longitudinally.

16. Process according to claim 13, wherein the welds are readily separable.

17. Process according to claim 13, wherein the perforation line is located parallel to an outer edge of the plastic film or plastic bag.

18. Process according to claim 13, wherein the perforation line extends around the weld in a semi-circular pattern.

19. Process according to claim 13, wherein the perforation line has a rectangular shape.

20. Process according to one of claims 13 to 19, wherein the ultrasonic welding is carried out by a pen-shaped sonotrode which penetrates the plastic films or plastic bags that are to be welded and forms a welding ring while doing so.

21. Process according to one of claims 13 to 19, wherein the ultrasonic welding is carried out by a sonotrode by pressing the sonotrode against the plastic layers which are to be welded through an opening in a hold-down device.

22. Process according to claim 20, wherein the pen-shaped sonotrode has a projection with a larger diameter that, at the end of the welding operation, rests on the top plastic film or plastic bag of the stack.

23. Process according to claim 22, wherein the projection has at least two points located opposite each other that are aimed at the stack in order to weld the top plastic films or plastic bags together.

24. Process according to claim 21, wherein the pen-shaped sonotrode has a projection with a larger diameter that, at the end of the welding operation, rests on the top plastic film or plastic bag of the stack.

25. Process according to claim 24, wherein the projection has at least two points located opposite each other that are aimed at the stack in order to weld the top plastic films or plastic bags together.

26. Process for bonding a plurality of plastic films or a plurality of plastic bags into a block from which each plastic film or plastic bag is removable individually, comprising arranging the plastic films or plastic bags in a stack and bonding the plastic films or plastic bags together in an edge zone of the stack by means of ultrasonic welding;

wherein the ultrasonic welding is carried out by a pen-shaped sonotrode which penetrates the plastic films or plastic bags that are to be welded and forms a welding ring while doing so;

wherein the pen-shaped sonotrode has a projection with a larger diameter that, at the end of the welding operation, rests on the top plastic film or plastic bag of the stack; and wherein the projection has at least two points located opposite each other that are aimed at the stack in order to weld the top plastic films or plastic bags together.

27. Process according to claim 26, wherein the ultrasonic welding forms at least two welds.

28. Process according to claim 26, wherein at least one weld extends longitudinally.

29. Process according to claim 26, wherein the welds are readily separable.

30. Process according to claim 26, wherein the welds are separated from the removable plastic film or plastic bag by a perforation line.

31. Process according to claim 30, wherein the perforation line is located parallel to an outer edge of the plastic film or plastic bag.

32. Process according to claim 30, wherein every weld is surrounded by a perforation line, which begins at one outer edge of the plastic film or plastic bag and ends at the same outer edge.

33. Process according to claim 32, wherein the perforation line extends around the weld in a semi-circular pattern.

34. Process according to claim 32, wherein the perforation line has a rectangular shape.

35. Process according to one of claims 26 to 34, wherein the ultrasonic welding is carried out by pressing the sonotrode against the plastic layers which are to be welded through an opening in a hold-down device.

\* \* \* \* \*